United States Patent [19]

Bohrer et al.

[11] 4,300,791
[45] Nov. 17, 1981

[54] OPTICALLY SCANNABLE ANSWER SHEET BOOKLET WITH SEQUENCE BARS PRINTED THEREON AND METHOD OF PRODUCING SAME

[75] Inventors: James B. Bohrer, Owatonna; Robert T. Collins, Chaska, both of Minn.

[73] Assignee: National Computer Systems, Inc., Minneapolis, Minn.

[21] Appl. No.: 134,631

[22] Filed: Mar. 27, 1980

[51] Int. Cl.$^3$ .................. B42F 21/00; B65H 39/02
[52] U.S. Cl. .................................. 283/38; 283/42; 270/54; 11/1 R
[58] Field of Search .................. 283/1 R, 37, 38, 41, 283/42; 270/54; 11/1 R

[56] References Cited

PUBLICATIONS

*Glossary of the Book*, Geoffrey Ashall Glaister; 1960.
"*Bookbinding*", by James Baine, Book Production Magazine.

*Primary Examiner*—Paul A. Bell
*Assistant Examiner*—John S. Brown
*Attorney, Agent, or Firm*—Peterson, Palmatier, Sturm & Sjoquist, Ltd.

[57] ABSTRACT

An optically scannable answer sheet booklet is comprised of a plurality of signatures which are folded to provide the various sheets or leaves of the booklet. The opposite sides of each sheet or leaf constitutes a page of the booklet and has printed thereon certain instructions or questions as well as so-called response areas or bubbles which are to be marked by the examinee. The various signatures are each printed with a sequence bar which collectively, if the correct number of signatures are properly inserted, form a recognizable pattern. If a signature is incorrectly inserted, duplicated or omitted, the pattern will be broken or will contain an extra sequence bar which apprises the inspector of faulty booklets.

6 Claims, 13 Drawing Figures

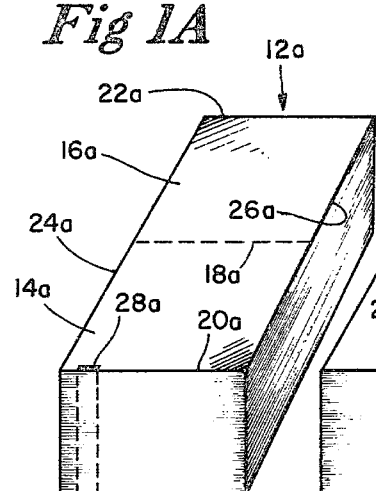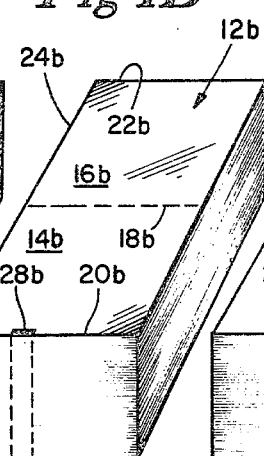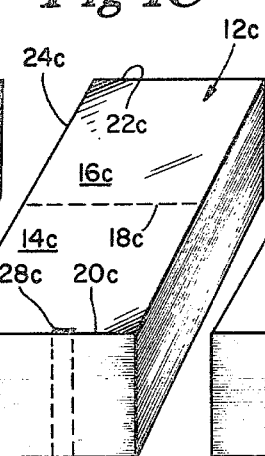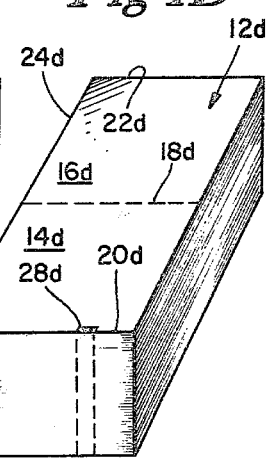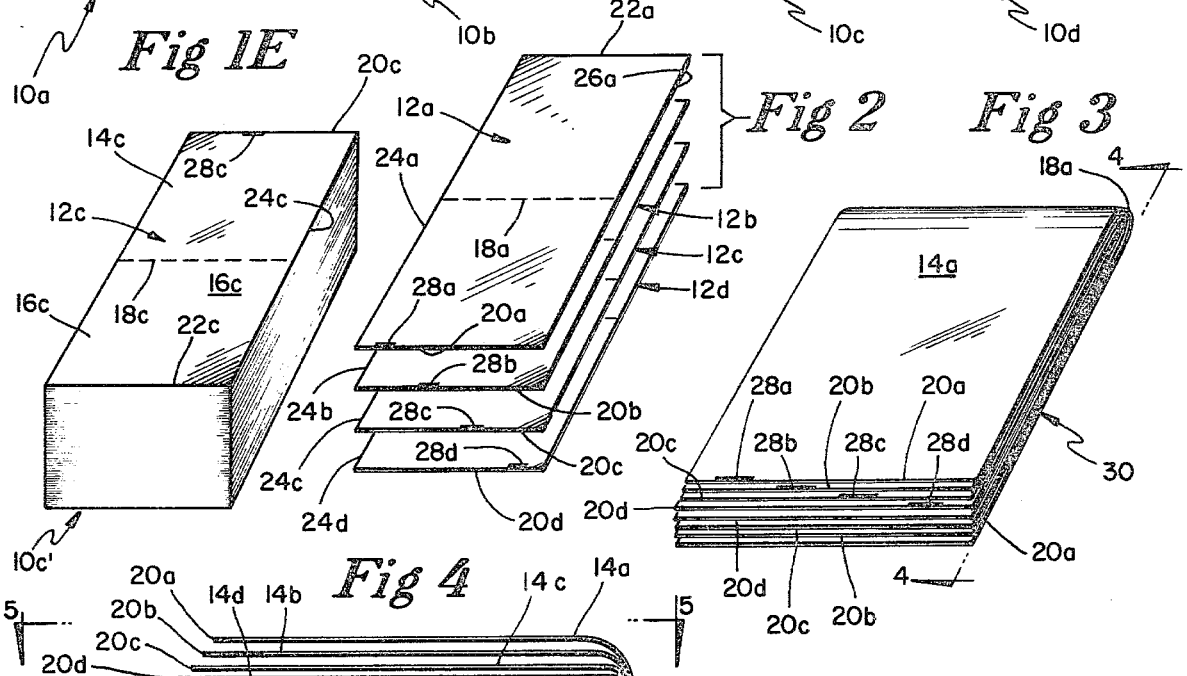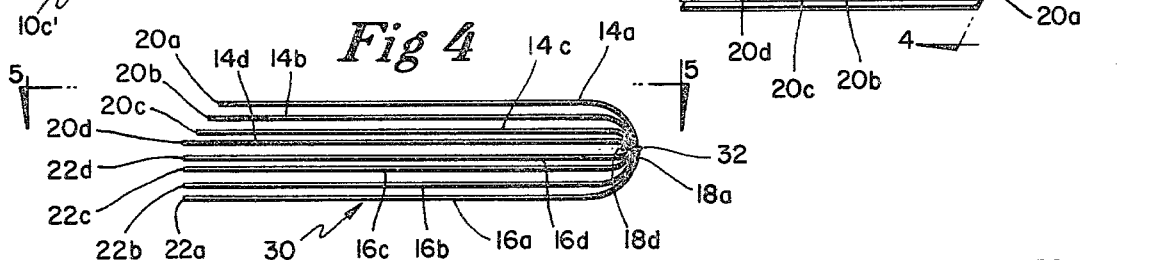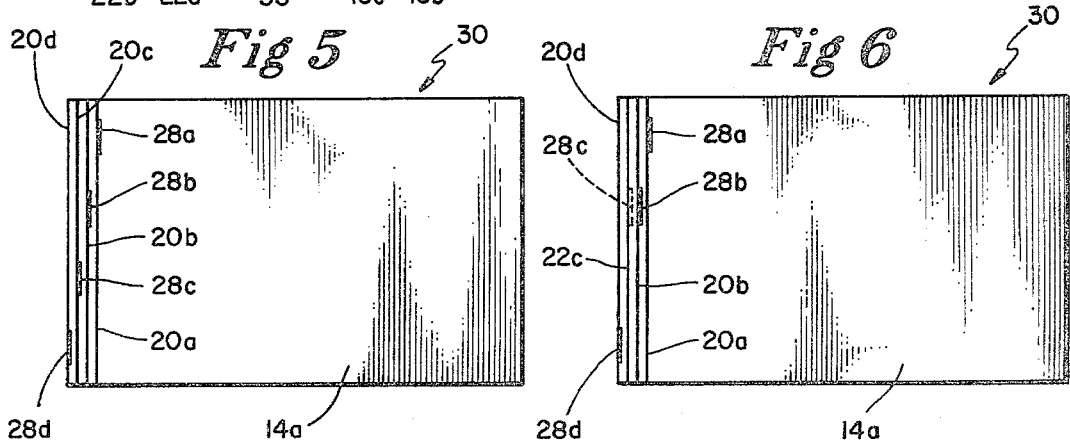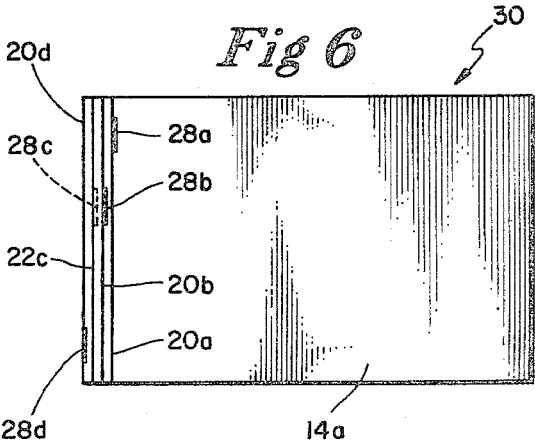

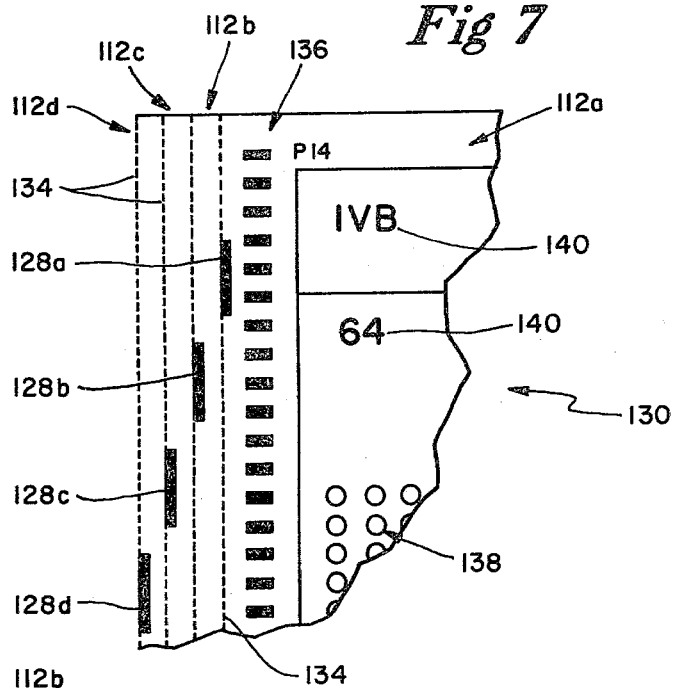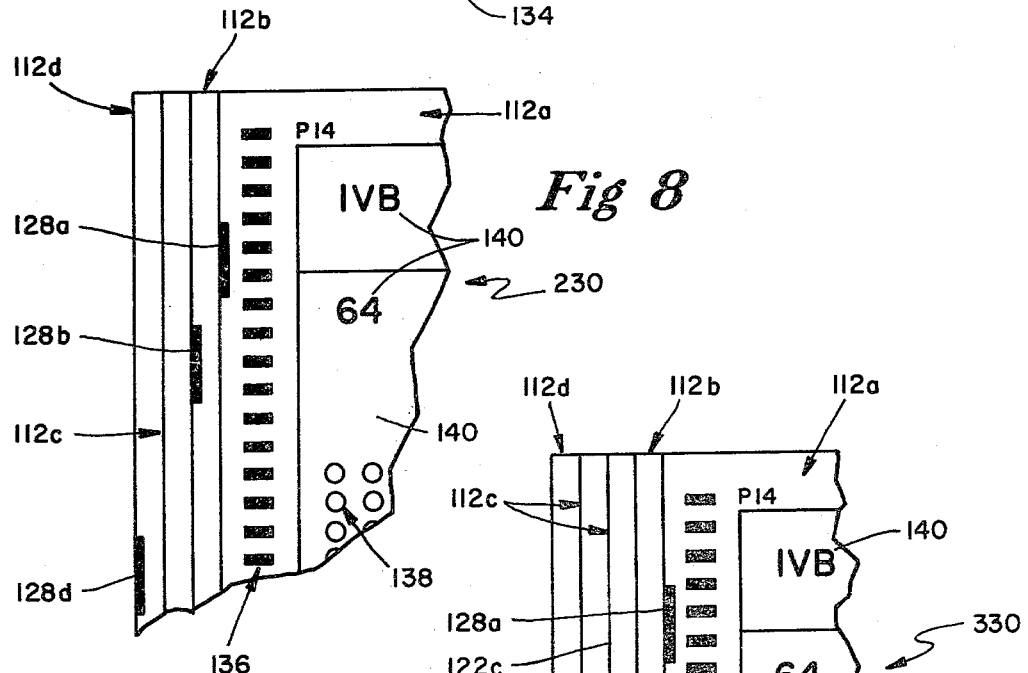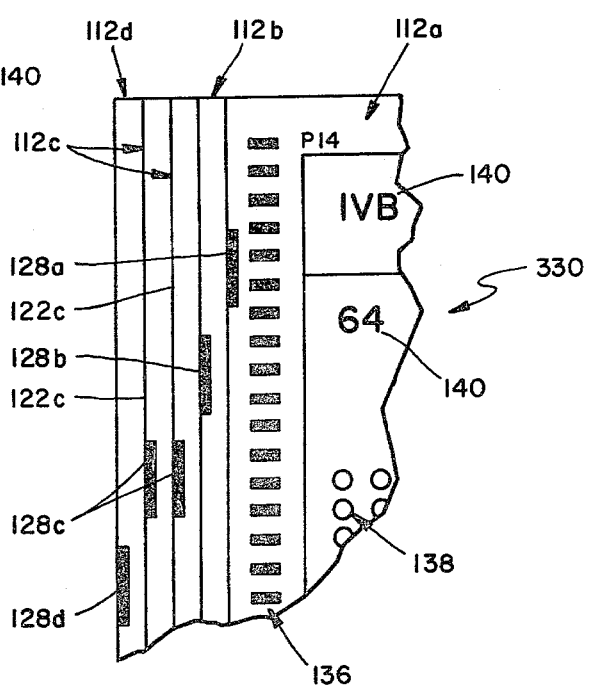

OPTICALLY SCANNABLE ANSWER SHEET BOOKLET WITH SEQUENCE BARS PRINTED THEREON AND METHOD OF PRODUCING SAME

BACKGROUND OF THE INVENTION

This invention relates generally to optically scannable answer sheets, and pertains more particularly to a booklet composed of a plurality of folded signatures which contain thereon sequence bars forming a predetermined pattern when the number of signatures is correct and the signatures are properly oriented with respect to each other.

SUMMARY OF THE INVENTION

The invention has for a general object the detection of faulty answer sheet booklets prior to being shipped to customers. In this regard, optically scannable answer sheet booklets are composed of a number of sheets or leaves, each two sheets being folded from a signature. In the collating of the signatures, it is important that the signatures all be properly oriented prior to stapling (or stitching) and folding. Also, it is important that a signature not be omitted or that a signature not be duplicated. Therefore, the present invention provides assurance that each booklet reaching the customer will be properly assembled and usable in an optical scanner.

Another object of the invention is to provide a method of minimizing the production of faulty answer sheet booklets that will not increase printing costs, yet provide assurance that the booklet will be acceptable for use by the purchaser and not reach the optical scanning equipment in a form in which it would have to be rejected should the examinee not have noted or has ignored the faulty condition.

Briefly, the invention envisages the printing of a sequence bar on each signature prior to it being folded, the various sequence bars being offset from each other so as to produce a visually discernible pattern when the signatures are all properly collated, yet presenting a broken pattern if one or more of the signatures has been turned the wrong way, a signature omitted, or signatures improperly duplicated.

BRIEF DESCRIPTION OF THE DRAWINGS

FIGS. 1A, 1B, 1C and 1D are perspective views of four stacks of signatures, the signatures all being properly oriented with respect to each other for assembling into an optically scannable answer sheet booklet.

FIG. 1E is a stack of signatures corresponding to those shown in FIG. 1C, but with the stack incorrectly oriented;

FIG. 2 is an exploded view of only four signatures, one from each of the stacks appearing in FIGS. 1A-1D prior to being assembled into booklet form;

FIG. 3 is a perspective view illustrating the four signatures of FIG. 3 after being folded and stapled;

FIG. 4 is a sectional view taken in the direction of line 4—4 of FIG. 3, the spacing between the leaves or sheets being somewhat exaggerated;

FIG. 5 is a top plan view of the booklet appearing in FIG. 3, the view being in the direction of line 5—5 of FIG. 4 and depicting to better advantage the predetermined pattern resulting from the proper orienting of the four signatures shown in FIG. 2;

FIG. 6 is a plan view corresponding to FIG. 5 but with one of the signatures improperly oriented and showing the resulting broken pattern;

FIG. 7 is a fragmentary view of a somewhat modified optically scannable answer sheet booklet on a larger scale, the sequence bars being more closely clustered together than in FIG. 5;

FIG. 8 is a view utilizing the same predetermined pattern of FIG. 7, but showing it broken as in FIG. 6 which indicates that one of the signatures has been improperly inserted, and FIG. 9 is a view similar to FIGS. 7 and 8, but showing the presence of two duplicate signatures in the same booklet.

DESCRIPTION OF THE PREFERRED EMBODIMENT

Referring first to FIG. 1A, this figure shows a stack 10a comprised of any number of duplicate signatures 12a, each signature being composed of panels 14a and 16a which are to constitute sheets or leaves of the assembled booklet. In this regard, the leaves 14a and 16a are of equal size, there being for the sake of description a fold line 18a midway between the opposite edges of the signatures 12a, the line 18a being imaginary in that it is non-existent or not printed in actual practice. Further, largely to facilitate the ensuing description, the four edges of the various signatures 12a contained in the stack 10a have been labeled 20a, 22a, 24a and 26a. It might be explained at this stage that the signatures are customarily 11"×17". More specifically, the edges 20a, 22a would be 11" long, and the edges 24a, 26a would be 17" long.

Up to this point, the description has dealt with signatures 12a that are conventional. Although not completely understandable at this time, it will be pointed out that the edge 20a has a bar 28a printed thereon, the location of which is quite important and which will be more fully dealt with hereinafter.

As far as the signatures 12b contained in the stack 10b are concerned, these are of the same size as the signatures 12a in the stack 10a. Quite obviously, the signatures 12b will have different information printed thereon as compared with the signatures 12a. Therefore, the suffix "b" has simply been added to the reference numerals of FIG. 1A which have used the suffix "a". It is important, though, to explain that the sequence bar 28b, which is marginally located along the edge 20b, is farther from the edge 24b than is the bar 28a from the edge 24a.

Regarding FIG. 1C, the suffix "c" has been employed as far as the stack 10c is concerned. Here again, the sequence mark 28c is still farther from the edge 24c in FIG. 1C than is the bar 28b of FIG. 1B.

Continuing, it is to be noted that the suffix "d" has been adopted as far as FIG. 1D is concerned. In this instance, the bar 28d is even farther from the edge 24d than is the bar 28c from the edge 24c.

Whereas the stacks 10a, 10b, 10c and 10d contain properly oriented signatures 12a, 12b, 12c and 12d, respectively, FIG. 1E contains signatures 12c that have been reversely oriented, that is, turned through 180° with respect to the others. As the description progresses, it will become manifest that if the stack, which has been identified as 10c' is incorrectly used instead of the correctly oriented stack 10c of FIG. 1C, then it follows that the resulting booklet will contain an improperly positioned signature 12c.

At this time, attention is directed to FIG. 2 which pictures the top signatures 12a, 12b, 12c and 12d taken from the top of the stacks 10a, 10b, 10c and 10d respectively, of FIGS. 1A–1D. In a sense, one can assume that the lowermost signature 12d in FIG. 2 is resting on a table, and that the signature 12c is being lowered thereagainst, the signature 12b then onto the signature 12c, and finally the signature 12a onto the signature 12b. The edges 22a, 22b, 22c and 22d are abutted against a vertical surface so that they all reside in a single vertical plane. From FIG. 4, it will be perceived that these edges 22a, 22b, 22c and 22d also remain vertically even with each other after folding, as will become clearer when the folding procedure is described.

Assuming now that the four signatures 12a–12d of FIG. 2 have been placed on top of each other, as mentioned above, then the four signatures are stapled or stitched. For the sake of illustration, staples 32 have been employed, these staples 32 penetrating the imaginary fold lines 18a, 18b, 18c and 18d to form the booklet identified generally by the reference numeral 30.

The next step is to fold the signatures 12a, 12b, 12c and 12d. It will be appreciated, however, that with the signatures all the same size, that is 11"×17", when folded, the 17" length is divided in two to form the sheets or leaves 14a and 16a, 14b and 16b, 14c and 16c, and 14d and 16d, which are then each 8-½" from a true centerline, such as the fold lines 18a, 18b, 18c and 18d.

The folding operation results in the signature 12d being literally creased along its imaginary fold line 18d so that the edges 20d and 22d are vertically aligned one above the other. However, the signature 12c, by reason of the folding, results in its edge 20c being inset somewhat as can be perceived from FIG. 4. By the same token, the edge 20b of the signature 12b is inset even more, whereas the edge 20a is inset still more. Since the edges 22a, 22b, 22c and 22d were vertically aligned prior to stapling, they remain so during the folding operation. It might be pointed out at this time that FIG. 4 is somewhat exaggerated with respect to the spacing between the resulting sheets or leaves. One can easily visualize that more signatures than those illustrated can be stapled together; for instance there might be twice the depicted number, which is only four, and that another sheet or leaf occupies each space between the sheets or leaves of FIG. 4.

By virtue of the insetting described above, slight marginal portions along the edges 20a, 20b, 20c and 20d are left exposed and since the bars 28a, 28b, 28c and 28d, respectively, have been printed in the marginal portions extending along these edges, it follows that the bars 28a, 28b, 28c and 28d are exposed to view. The width of the bars 28a, 28b, 28c and 28d is not critical, for only a narrow segment of the bars need be exposed to view in order to reveal to the inspector that a predetermined sequence pattern of such bars has been produced by reason of the proper orientation of the various signatures 12a, 12b, 12c and 12d constituting the booklet 30.

Although the proper predetermined bar sequence appears in FIG. 3, the larger scale of FIG. 5 more aptly illustrates the regularity of the pattern when the four signatures 12a–12d are properly oriented in the assembled booklet 30.

Assuming now that the signature 12c is taken from an improperly positioned stack, such as the stack labeled 10c' in FIG. 1E, then the result shown in FIG. 6 occurs. The signature 12c under these circumstances is reversely oriented, or turned through 180° with respect to the other signatures 12a, 12b and 12d, so that its bar 28c is not visible. In FIG. 6 the bar 28c has been indicated in phantom outline because it is concealed (by reason of it being reversely oriented). The point to be made, though, is that the predetermined pattern of FIG. 5 no longer exists, being broken by the incorrect insertion of the signature 12c. It should also be noted that if a signature is not reversely oriented, but instead is upside down, that is, inverted, the pattern will also be broken, as is believed obvious. Accordingly, it should be appreciated that our invention assures complete reliability as to the proper insertion of signatures.

Actually, the arrangement illustrated in FIGS. 1–6 has involved a locating of the various bars 28a, 28b, 28c and 28d in a longitudinally displaced or separated relation that would not normally be utilized in practice. Stated somewhat differently, the drawing scale has permitted the picturing of a completed booklet 30 containing only four signatures, although a greater number of signatures will frequently be involved, but has not lent itself readily to showing the sequence bars in a closely clustered relationship, such as has been used in the actual manufacture of booklets of this type. Therefore, FIGS. 7, 8 and 9 have been presented, these figures showing a fragmentary corner of a booklet where the sequence pattern is concentrated in what amounts to one corner of the booklet, the view corresponding approximately to the actual size of the booklet.

Thus, it will be noted from FIG. 7 that the fragmentarily depicted booklet has been indicated generally by the reference numeral 130. Since the signatures are different because of the different locations of the sequence bars, the prefix "1" has been used, and the prefix "1" has also been used as far as the bars themselves are concerned. All that is really different is that the sequence marks or bars 128a, 128b, 128c and 128d are not longitudinally displaced or separated from each other to the degree that the bars 28a, 28b, 28c and 28d are.

Since the enlarged scale of FIG. 7 permits the showing of a more realistic pattern on a booklet, the booklet having been given the reference numeral 130 as explained above, additional information can be shown that is exemplary of printed material appearing on commercially produced booklets. Thus, it is possible in FIGS. 7, 8 and 9 to depict trim marks 134, these marks 134 being only diagrammatically representative of those that are used in actual practice, as well as a timing track 136 composed of a series of black rectangles, and a representative sampling of response areas or bubbles 138. Still further, some identifying indicia has been indicated by the reference numeral 140. What has not been presented are some of the printed instructions or directions that normally appear on optically scannable answer sheet booklets. It might also be pointed out that one is looking at the backside of the booklet.

FIG. 7, it will be understood, fragmentarily represents a booklet 130 that has the signatures 112a–112d properly assembled. In other words, FIG. 7 corresponds to FIG. 5 as far as depicting a correct pattern is concerned, both showing the backs of booklets.

In contradistinction to the proper orienting of the various signatures 112a–112d as shown in FIG. 7, FIG. 8 pictures the signature 112c reversely oriented, just as the signature 12c is reversely oriented in FIG. 6. Hence, it is evident that the predetermined pattern of FIG. 7 has been broken and the inspector is visually apprised that the booklet 230 of FIG. 8 is faulty.

Turning now to FIG. 9, the booklet denoted generally by the reference numeral 330 in this figure is also faulty, this time by reason of the duplicate insertion of two signatures 112c resulting in the showing of two sequence marks 128c. It is due to the folding operation that the two sequence marks 128c are offset from each other because the edges 122c are inset attributable to the shortening caused by the folding of the various signatures constituting the booklet 330.

When utilizing the teachings of the present invention, the virtual elimination of faulty booklets is realized so that faulty booklets are not shipped to the customer. When faulty books are shipped, as in the past, it can be appreciated that if an examinee is given such a booklet, he or she might not recognize the situation until a portion of the examination or test time has already elapsed thereby invalidating the test for that person since time is usually a factor. Inasmuch as the invention also makes the omission of a signature readily discernible to the inspector prior to shipment so that it is not shipped, it can be explained that should such a faulty booklet get into the hands of a student, such a person might not recognize that a signature is missing and under these circumstances the test would again be ruined for that particular examinee. It is also possible for the examinee to either not note or ignore an improperly assembled booklet, the faulty booklet then having to be rejected during the scanning procedure. Therefore, the invention has considerable merit in promoting good customer relations, avoiding customer displeasure that has occurred in the past.

It might also be mentioned that the printer can make every effort to have the stacks of individual signatures properly oriented, but when the stacks are brought from the printing press, they can inadvertently be turned around or inverted due to carelessness. In assembling the signatures, there can be the inadvertent omission of one signature, or there can be the adding of a duplicate signature, either of such last-mentioned events also resulting in a faulty booklet.

What is claimed is:

1. An optically scannable answer sheet booklet comprising a plurality of folded signatures, each signature having a sequence bar marginally printed adjacent one edge thereof which bar is displaced from those bars on other signatures to form a predetermined pattern of sequence bars when the correct number of signatures is included and the signatures are properly oriented with respect to each other, said edges being free edges and progressively inset from each other so as to expose to view at least a portion of each bar forming said predetermined pattern.

2. An optically scannable answer sheet booklet comprising a plurality of folded signatures, each signature having a sequence bar marginally printed adjacent one edge thereof which bar is displaced from those bars on other signatures to form a predetermined pattern of sequence bars when the correct number of signatures is included and the signatures are properly oriented with respect to each other, the innermost signature having its said one edge aligned or in registry with the opposite edge of said innermost signature, and the corresponding said edges of the additional signatures being inset by reason of the signatures being folded so as to expose to view each sequence bar when the correct number of signatures is included and the signatures are properly oriented with respect to each other.

3. An optically scannable answer sheet booklet in accordance with claim 2 in which the sequence bar on the outermost signature is near the edge of said outermost signature extending perpendicularly to the one edge adjacent which the sequence bar on said outermost signature is printed, and the sequence bar on the innermost signature is farthest from said perpendicularly-extending edge, the sequence bars on the intermediate signature or intermediate signatures being at distances from said perpendicularly extending edge less than the sequence bar on said innermost signature.

4. An optically scannable answer sheet booklet in accordance with claim 3 in which said sequence bars are spaced apart being less than the length of said adjacent bars.

5. An optically scannable answer sheet booklet in accordance with claim 3 in which said sequence bars are clustered in one corner portion of the booklet.

6. A method of producing optically scannable answer sheet booklets composed of a plurality of signatures, the method comprising the steps of printing a sequence bar adjacent one edge of each signature, and folding the signatures about a line midway between the edge adjacent which the sequence bars appear and the opposite edges of said signatures so that the innermost signature has its edges aligned and the other signatures have their edges progressively inset to expose to view a predetermined pattern of sequence bars formed when the correct number of signatures are included and are properly oriented with respect to each other.

* * * * *